United States Patent
Pohl et al.

(10) Patent No.: US 12,210,903 B1
(45) Date of Patent: Jan. 28, 2025

(54) SCHEDULING A WORKLOAD IN A COMPUTER SYSTEM

(71) Applicant: International Business Machines Corporation, Armonk, NY (US)

(72) Inventors: Thomas Pohl, Weil im Schoenbuch (DE); Uwe Karl Hansmann, Tuebingen (DE); Timo Kussmaul, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/455,689

(22) Filed: Aug. 25, 2023

(51) Int. Cl.
  *G06F 16/33* (2019.01)
  *G06F 9/48* (2006.01)
  *G06F 11/34* (2006.01)
  *G06F 16/31* (2019.01)

(52) U.S. Cl.
  CPC ........ *G06F 9/4893* (2013.01); *G06F 11/3414* (2013.01); *G06F 11/3428* (2013.01); *G06F 16/328* (2019.01); *G06F 16/3349* (2019.01)

(58) Field of Classification Search
  CPC .............. G06F 9/4893; G06F 11/3414; G06F 11/3428; G06F 16/328; G06F 16/3349
  See application file for complete search history.

(56) References Cited

U.S. PATENT DOCUMENTS

| | | | |
|---|---|---|---|
| 10,404,547 B2 | 9/2019 | Bartfai-Walcott | |
| 11,144,443 B2 | 10/2021 | Haubold et al. | |
| 11,171,854 B2 | 11/2021 | Nash | |
| 11,385,936 B1* | 7/2022 | Aleti | G06F 16/27 |
| 11,561,836 B2 | 1/2023 | Eberlein | |
| 2011/0154353 A1 | 6/2011 | Theroux | |
| 2014/0279805 A1 | 9/2014 | Pangborn | |
| 2016/0328273 A1 | 11/2016 | Molka | |
| 2019/0334786 A1 | 10/2019 | Dutta et al. | |
| 2020/0334260 A1* | 10/2020 | Kussmaul | G06F 3/0486 |

(Continued)

OTHER PUBLICATIONS

Author Unknown, "Learning to Rank" Apache Solr Reference Guide 8.7, https://solr.apache.org/guide/8_7/learning-to-rank.html, Accessed Jul. 17, 2023, pp. 1-14.

(Continued)

*Primary Examiner* — Etienne P Leroux
*Assistant Examiner* — Cindy Nguyen
(74) *Attorney, Agent, or Firm* — Edward J. Wixted, III

(57) ABSTRACT

In an approach, a processor indexes system documents of a computer system using a text search engine, resulting in a search index, where the computer system is described by a set of system parameters with values stored in the system documents. A processor provides a set of scheduling rules for allocating computing resources of the computer system, each scheduling rule comprising a search query referencing one or more of the system parameters. A processor executes search queries by the text search engine against the search index, resulting in scored system documents and associated search queries. A processor ranks at least part of the set of scheduling rules using scores of the associated search queries. A processor selects scheduling rules in accordance with the ranking. A processor executes the selected scheduling rules for scheduling a workload on the computer system.

19 Claims, 8 Drawing Sheets

(56) References Cited

U.S. PATENT DOCUMENTS

2021/0117425 A1* 4/2021 Rao .................... H04L 41/0806

OTHER PUBLICATIONS

Doulamis, et al., "Adjusted fair scheduling and non-linear workload prediction for QoS guarantees in grid computing", ScienceDirect, https://www.sciencedirect.com/science/article/abs/ pii/ S0140366405004561?via%3Dihub, Computer Communications, 30, (2007), Available online Jan. 9, 2006, pp. 499-515.

Goswami, et. al., "Optimization of Workload Scheduling in Computational Grid", ResearchGate, https://www.researchgate.net/ publication/315330484, Chapter in Advances in Intelligent Systems and Computing, Mar. 2017, pp. 1-9.

Majd, et al., "Optimizing scheduling for heterogeneous computing systems using combinatorial meta-heuristic solution", https:// ieeexplore.ieee.org/document/8397655, IEEE, Jun. 28, 2018, pp. 1-10.

* cited by examiner

SCHEDULING A WORKLOAD IN A COMPUTER SYSTEM

BACKGROUND

The present invention relates to digital computer systems, and more specifically, to an approach for scheduling a workload in a computer system.

Predicting and scheduling workload on a computer system ensures optimal usage of available resources. Approaches exist for monitoring resource usage of a first application to obtain resource usage data associated with the first application. A workload signature may be generated for the first application based on the obtained resource usage data and resource usage of a second application may be predicted based on the workload signature of the first application.

SUMMARY

Various embodiments provide a method for scheduling a workload in a computer system, computer program product and computer system as described by the subject matter of the independent claims. Advantageous embodiments are described in the dependent claims. Embodiments of the present invention can be freely combined with each other if they are not mutually exclusive.

According to an embodiment of the present invention, a computer-implemented method, computer program product, and computer system are provided. A processor indexes system documents of a computer system using a text search engine, resulting in a search index, where the computer system is described by a set of system parameters with values stored in the system documents. A processor provides a set of scheduling rules for allocating computing resources of the computer system, each scheduling rule comprising a search query referencing one or more of the system parameters. A processor executes search queries by the text search engine against the search index, resulting in scored system documents and associated search queries. A processor ranks at least part of the set of scheduling rules using scores of the associated search queries. A processor selects scheduling rules in accordance with the ranking. A processor executes the selected scheduling rules for scheduling a workload on the computer system.

BRIEF DESCRIPTION OF THE DRAWINGS

In the following embodiments of the invention are explained in greater detail, by way of example only, making reference to the drawings in which.

DETAILED DESCRIPTION

Figure 1:
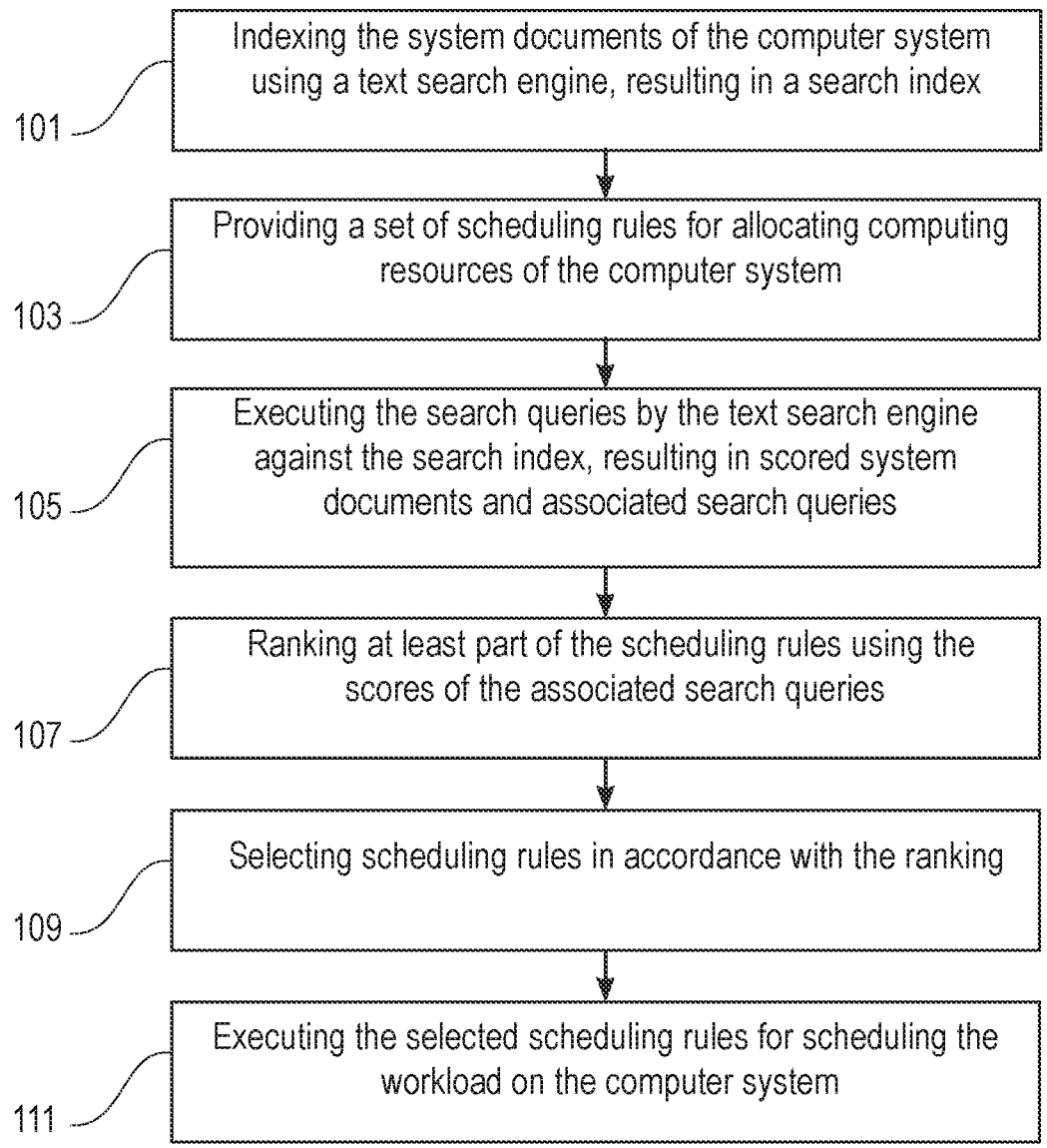
FIG. 1 is a flowchart of a method for scheduling a workload in a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to an aspect of the invention, there is provided a computer-implemented method for scheduling a workload in a computer system, the computer system being described by a set of system parameters whose values are stored in system documents. The method includes indexing the system documents of the computer system using a text search engine, resulting in a search index. The method further includes providing a set of scheduling rules for allocating computing resources of the computer system, each scheduling rule comprising a search query referencing one or more of the system parameters The method further includes executing the search queries by the text search engine against the search index, resulting in scored system documents and associated search queries. The method further includes ranking at least part of the set of scheduling rules using scores of the associated search queries. The method further includes selecting scheduling rules in accordance with the ranking; and executing the selected scheduling rules for scheduling the workload on the computer system.

The computer system may provide resources for executing workloads. The workload refers to one or more software applications and/or data accessed by the one or more software applications. The resources may comprise physical resources and/or logical resources. A logical resource may refer to software and/or firmware that logically partition the physical resources on a computer system. For example, a logical resource such as a logical partition (LPAR) may represent processors, memory, and I/O slots available in one processor complex. The physical resources may, for example, comprise at least one of: storage resources, processing resources, and network resources. The network resources may comprise, for example, a data rate and network bandwidth for transmission of data. The storage resources may indicate the type of storage such as disk and memory and the storage capacity. The processing resources may, for example, comprise one or more processing units. The computer system may be described by a set of parameters. The set of parameters may be referred to as set of system parameters. The set of system parameters may describe the characteristics of the computer system. The set of system parameters may, for example, describe the characteristics of the computer system in a given time period. The given time period may, for example, be a current time period or a previous time period. The set of system parameters may include hardware parameters, software parameters, and/or runtime parameters. The runtime parameter may, for example, comprise the number of programs that are executed per time unit in the computer system or the amount of input and output data to the computer system. The set of system parameters may be user defined parameters. Alternatively, the set of system parameters may be selected (e.g., randomly) from a larger set of parameters that is provided by the computer system.

However, the workloads may have different requirements. The requirements may include resource requirements, time requirements, service level agreement (SLA) requirements or other individual requirements. For that, a scheduling of resources may be used. The scheduling may enable a variety of applications to share resources efficiently, driving up utilization while ensuring the individual requirements.

The present subject matter may provide a set of scheduling rules. The scheduling rule may comprise a selection criterion on a subset of the set of system parameters. The selection criterion and the subset of system parameters of the scheduling rule may be determined based on a goal of the scheduling rule. The goal of the scheduling rule may be defined based on the requirements of the workloads. For example, if the goal is to minimize the utilization in the computer system, the selection criterion may select higher ranked resources of the computer system, wherein the ranking may be based on the utilization level of the resources. In another example, if the goal is to reduce workload on aging chips, the selection criterion may select resources based on the utilization level of the resources, the temperature of the chip hosting the processors, and the Negative Bias Temperature Instability (NBTI) of the chip. Thus, the scheduling rule may be defined by a selection criterion and a subset of system parameters of the computer system. In addition, the scheduling rule according to the present subject matter may further be defined by a query. The query of each scheduling rule may reference one or more system parameters, named optimization parameters. The query of the scheduling rule may comprise a selection criterion on the optimization parameter(s) of the scheduling rule.

The set of system parameters may be provided in system documents. The system documents may be documents. The document may be an electronic document. The electronic document may comprise text information, images, figure information, or other information that may be parsed by the computer system. The system documents may be indexed by parsing and tokenizing them using a tokenizer and storing the tokens in the search index. This may enable a fast and accurate information retrieval. The tokenizer may be configured to identify tokens for computer systems and their system parameters. The tokens may be indicative of the set of system parameters. The purpose of storing the search index may be to optimize speed and performance in finding relevant system documents for a search query. Without the search index, the text search engine may scan every system document, which may require considerable time and computing power. The text search engine may use a scoring function. The scoring function returns a relevance score that measures how well a system document satisfies the search query as compared with the other system documents. The scoring function may be based on one or more criteria that are specified in the search query and the content of the system document. Thus, the execution of the search query by the text search engine may result in a set of scored system documents. The execution of a set of search queries by the text search engine against the search index may result in multiple sets of scored system documents, where each set of scored system documents may be associated with a search query. In consequence, when executing multiple search queries by the text search engine, this may result in different scores assigned to one system document. For example, the results may be represented by tuples, where each tuple may comprise the triplet (e.g., system document, search query, score), where the score in the triplet is calculated for the search query and the system document. When executing multiple search queries by one text search engine, this allows comparison of the scores of a specific system document for different search queries. Thus, it is possible to determine the search query out of the set of multiple search queries that provides the highest score for a specific system document. This also means that the search queries are associated with the scores respectively. This in turn means that the scheduling rules are associated with the scores respectively because each scheduling rule is associated with the respective search query. The system document is scored means that it is assigned a score. The score is specific for the system document and a search query that produced that system document.

The present subject matter may enable a dynamic and optimal scheduling based on an improved schedule selection mechanism. The selection mechanism may be fast because it uses text-based queries. This may speed up the overall execution time of the computer system. The selection is accurate because it may use a high number of scheduling rules based on up-to-date values of the set of system parameters of the computer system.

The at least part of the scheduling rules which are ranked may be the set of scheduling rules. Alternatively, the at least part of the scheduling rules which are ranked may comprise a randomly selected subset of the set of scheduling rules. Alternatively, the at least part of the scheduling rules which are ranked may comprise a user defined subset of the set of scheduling rules. Alternatively, one or more resources of the computer system may be selected, and one or more system documents of the set of documents that describe the selected one or more resources may be identified. For each system document of the identified system documents, the one or more search queries that produced the system document may be identified. The at least part of the scheduling rules which are ranked may comprise the scheduling rules associated with the identified search queries. This example may be advantageous as it may guide or focus the scheduling to selected resources of the computer system.

According to one example, the method further comprises: storing each scheduling rule in a respective scheduling rule document, indexing the scheduling rule documents using the text search engine, resulting in another search index, searching by the text search engine the other search index for identifying the search queries for performing the execution of the search queries. This example may further speed up the scheduling according to the present subject matter because another text search index that summarizes the queries is used to find scheduling rules. The text search engine may use an indexer to create the two above described search indexes. The indexer may or may not be part of the text search engine.

According to one example, the selected scheduling rules are the first N ranked scheduling rules, wherein N is a predefined integer of at least one. The number N may, for example, be provided as a configurable parameter of the computer system that may be set e.g., based on user needs. This example may be advantageous as it may provide configurable and controllable scheduling of resources.

According to one example, the method further comprises repeatedly performing the indexing in response to detecting an update of the system documents, wherein the approach uses the current (updated) search index. For example, the search index may regularly be updated in case one or more system documents are changed. Such an approach may be executed on the last updated version of the search index. This may be technically enabled by storing only the last version of the search index. This example may further improve the scheduling and thus usage of resources by taking into account up-to-date characteristics of the computer system.

According to one example, the method further comprises receiving a request to schedule the workload, and in response to receiving the request automatically performing the executing of the search queries, the ranking of the at least part of the scheduling rules, the selecting of scheduling rules, and the execution of the selected scheduling rules. The present method may automatically be performed upon receiving the request to schedule the workload. This may further speed up the scheduling according to the present subject matter compared to a user triggered or semi-automatic scheduling of resources.

According to one example, the method is performed by a firmware module of the computer system. This may be advantageous because the firmware may establish a direct control of the hardware components of the computer system. It may also enable a safer implementation as it may only be accessible to a limited number of users.

According to one example, the computer system is partitioned into multiple logical partitions (LPARs), wherein the set of system parameters are descriptive of logical resources of the LPARs. For example, a system parameter may describe the number of processors in a LPAR, their utilization, and their associated chip characteristics. The logical partition may be a subset of the computer system's resources, virtualized as a separate computer. The computer system may be partitioned into multiple LPARs, each housing a separate operating system.

According to one example, the search queries may be user defined queries. For example, previously used search queries in one or more systems may be used to define the search query in the scheduling rules.

For example, the scoring function may be based on or determined using a trained machine learning (ML) model. The ML model may be a Learn to Rank (LTR) model. The ML model may, for example, be trained using a training dataset comprising entries, each entry comprises a system document and associated query that has identified it as relevant in the computer system and a label indicating the relevancy of the document. The training dataset may be built using previous scheduling results. The training data may be created based on feedback on previous search queries. For that, a functional component may be provided to gather and monitor implicit feedback on previous scheduling and augment training data with this feedback. This example may enable to consistently and automatically adapt the working of the computer system.

According to one example, the hardware parameters include a selection from a utilization level of a central processing unit or a utilization level of a core comprising a group of central processing unites. For example, the hardware parameters may include a utilization level of a single central processing unit or a group of multiple central processing units. This may allow the process to function with a variety of different hardware setups.

According to one example, the system parameter comprises any one of: ambient temperature of a processor of the computer system, chip temperature of a chip of a processor of the computer system, Negative Bias Temperature Instability (NBTI) of a chip of a processor of the computer system, chip power of a chip of a processor of the computer system, chip identifier of a chip of a processor of the computer system, or utilization level of a processor of the computer system. The processor may comprise one or more on-chip CPUs. An NBTI sensor may be used for measuring the chip NBTI. The NBTI sensor may be on-chip NBTI sensor.

In one example, the present method may be provided as a cloud instance in the cloud computing environment. The cloud instance may be a server resource provided by cloud services. In one example, the present scheduling method may be implemented using one or more functional abstraction layers provided by the cloud computing environment e.g., the workload layer of the cloud computing environment may for example be used to implement the scheduling according to the present subject matter.

FIG. 1 is a flowchart of a method for scheduling a workload in a computer system. The computer system may be described by a set of system parameters whose values are stored in system documents.

A process may index the system documents of the computer system in step 101 using a text search engine. This may result in a search index.

A process may provide a set of scheduling rules for allocating computing resources of the computer system in step 103. Each of the scheduling rules comprises a search query referencing one or more of the system parameters.

A process may execute the search queries in step 105 by the text search engine against the search index. In some embodiments, the process may execute all the search queries in the provided scheduling rules in step 105. This may result in multiple sets of scored system documents where each score is specific for a system document and a search query.

A process may rank at least part of the set of scheduling rules in step 107 using the scores of the associated search queries. Different approaches may be used to provide the at least part of the scheduling rules. For example, one system document (e.g., a system document that is associated with a specific preselected resource like a LPAR, where the scheduling should be performed) may be selected, wherein the at least part of the set of scheduling rules are scheduling rules which comprise the search queries that produced the selected system document, and then ranking the search queries according to the scores it produced for the selected system document.

A process may select scheduling rules of the ranked scheduling rules in step 109 in accordance with the ranking.

A process may execute the selected scheduling rules in step 111 for scheduling the workload on the computer system. This may, for example, result in allocation of resources of the computer system to execute the workflow at a scheduled time. The workflow may be executed using the allocated resources and at the scheduled time. The allocated resources may fulfil the rule(s) of the one or more selected scheduling rules.

Figure 2:
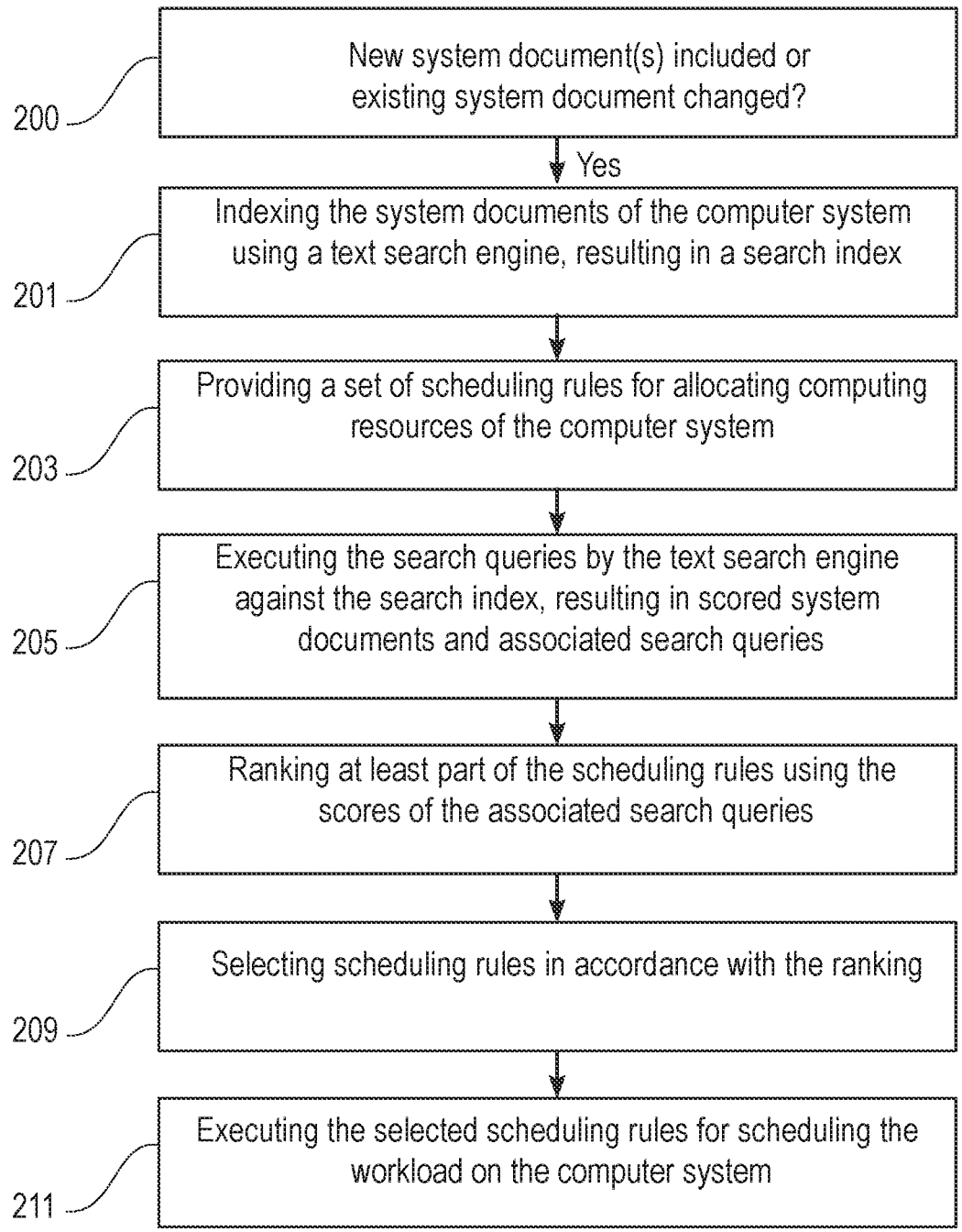
FIG. 2 is a flowchart of a method for scheduling a workload in a computer system in accordance with an example of the present subject matter.

FIG. 2 is a flowchart of an approach for scheduling a workload in a computer system. The computer system may be described by a set of system parameters whose values are stored in system documents.

In step 200, a process determines whether new system documents or existing system documents have changed. If so, the process indexes the system documents of the computer system, in step 201, using a text search engine. This may result in a current search index.

In step 203, the process provides a set of scheduling rules for allocating computing resources of the computer system.

Each of the scheduling rules comprises a search query referencing one or more of the system parameters.

In step 205, the process executes the search queries by the text search engine against the current search index. The process may, in some embodiments, execute all of the search queries in the provided scheduling rules, resulting in scored system documents and associated search queries. The system document being scored means that the system document is assigned a score. The score is specific for the system document and a search query that produced the system document.

In step 207, the process ranks at least part of the set of scheduling rules using the scores of the associated search queries. The at least part of the scheduling rules may be the set of scheduling rules. Alternatively, the at least part of the scheduling rules which are ranked may comprise a randomly selected subset of the set of scheduling rules. Alternatively, the at least part of the scheduling rules which are ranked may comprise a user defined subset of the set of scheduling rules. Alternatively, one or more resources of the computer system may be selected, and one or more system documents of the set of documents that describe the selected one or more resources may be identified. For each system document of the identified system documents, the one or more search queries that produced the system document may be identified. The at least part of the scheduling rules which are ranked may comprise the scheduling rules associated with the identified search queries. This example may be advantageous as it may guide or focus the scheduling to selected resources of the computer system.

In step 209, the process selects scheduling rules of the ranked scheduling rules, in accordance with the ranking.

In step 211, the process executes the selected scheduling rules for scheduling the workload on the computer system. This may, for example, result in allocation of resources of the computer system to execute the workflow at a scheduled time. The workflow may be executed using the allocated resources and at the scheduled time. The allocated resources may fulfil the rule(s) of the one or more selected scheduling rules.

Figure 3:
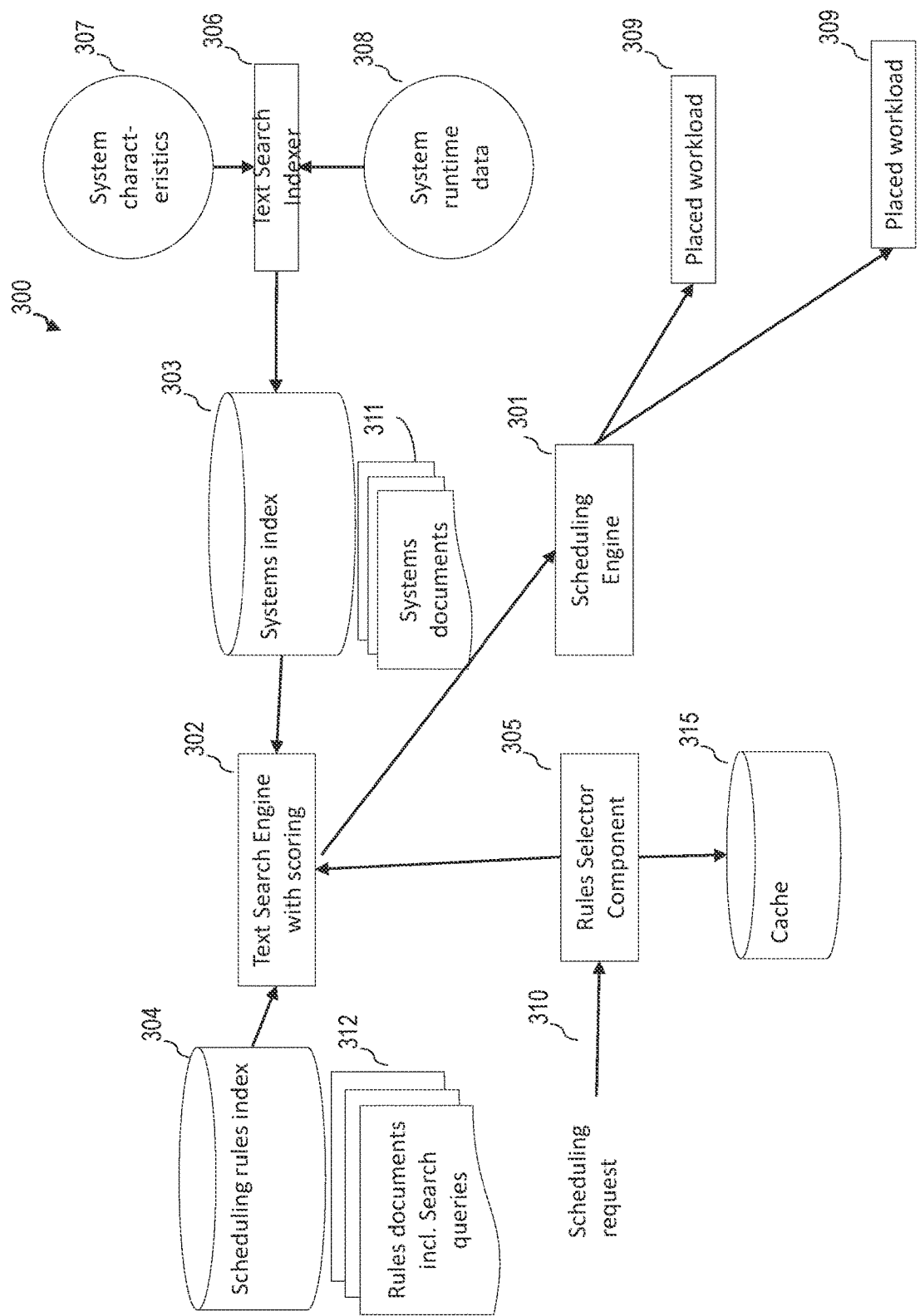
FIG. 3 is a block diagram for a computer system in accordance with an example of the present subject matter.

FIG. 3 is a diagram of a computer system in accordance with an example of the present subject matter.

The computer system 300 comprises a scheduling engine 301 and a text search engine 302. The scheduling engine 301 may be configured to use an indexer 306 to index system documents 311 into the search index 303 and to index rules documents 312 into another search index 304. The indexer 306 may enable to index the system characteristics 307 and system runtime data 308 which are described in the system documents 311. Although shown as a separate component of the computer system 300, the indexer 306 may be in another example be part of the text search engine 302.

Upon receiving a scheduling request 310 at the computer system 300, a rules selector component 305 of the computer system 300 may select at least one system document. This selection may be based on content of the system document. The selection may be implemented by the rules selector component independently or in coordination with other components such as, for example, the Scheduling Engine. The selection may be done by searching for system documents comprising a specific name (e.g., the name of a LPAR, where the scheduling to a specific central processor (CP) or chip should be performed). The rules selector component may search using the text search engine 302 the search index 304 in order to identify the queries associated with the scheduling rules. A cache 315 of the computer system 300 may be used by the rules selector component 305 to store intermediate results.

The scheduling engine 301 or the rules selector component 305 may execute the identified queries against the search index 303 using the text search engine 302. This may result in scored system documents 311 where the score is associated with search queries. The scheduling engine 301 may rank the scheduling rules based on the scores for the selected system document(s) and then place (309) the workload by selecting scheduling rules based on the ranking and executing the selected scheduling rules.

Figure 4:
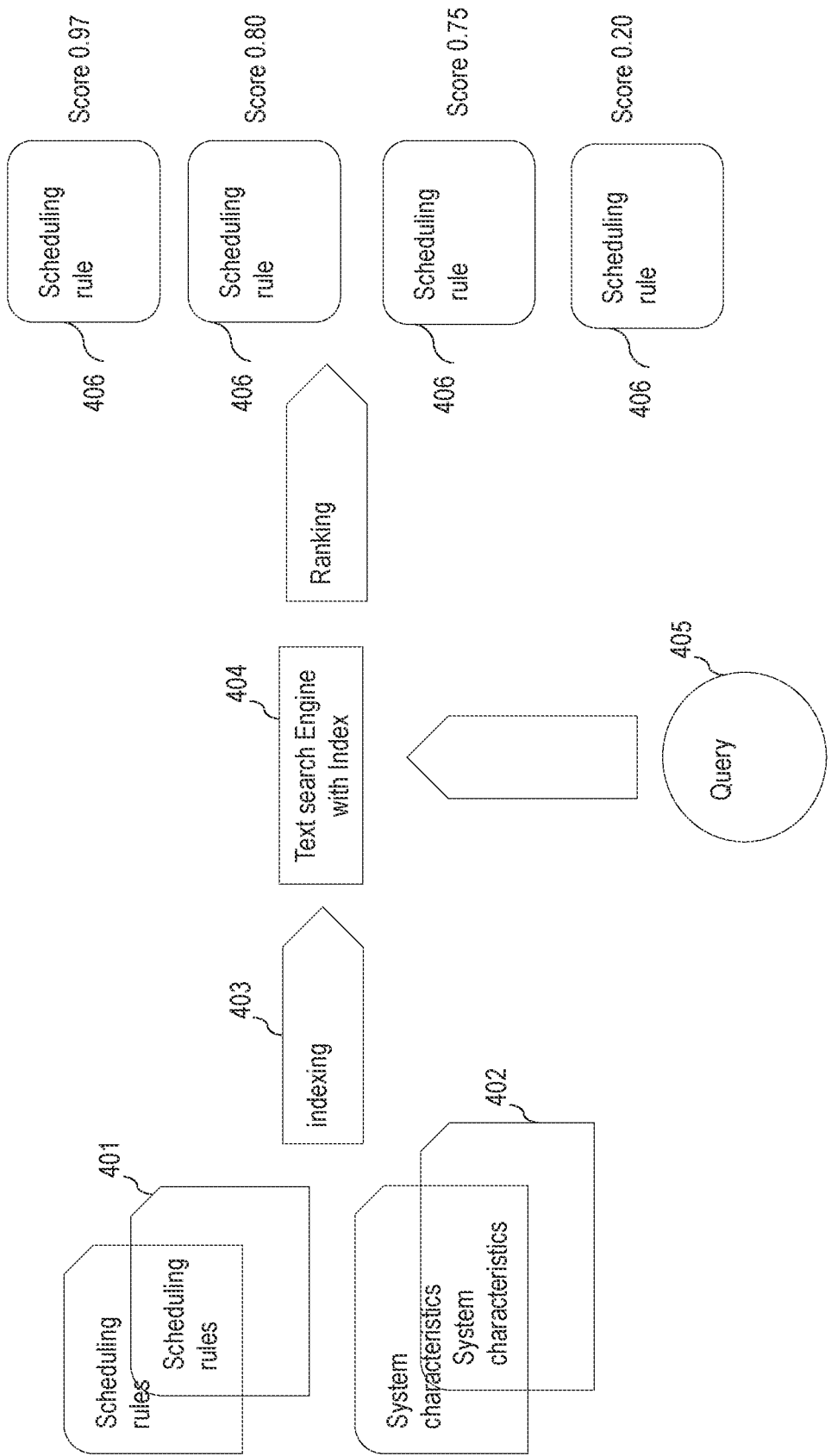
FIG. 4 is a diagram illustrating a method for scheduling a workload in a computer system in accordance with an example of the present subject matter.

FIG. 4 is a diagram illustrating an approach for scheduling a workload in a computer system in accordance with an example of the present subject matter.

Scheduling rules documents 401 and system characteristics documents (or system documents) 402 may be indexed (403) to provide respective indexes. A text search engine 404 may comprise the created indexes. The text search engine 404 may execute queries 405 against the search index of the system documents 402. The scores of the system documents may be used to rank their associated scheduling rules 406. FIG. 4 shows the ranked scheduling rules 406 and associated scores.

Figure 5:
FIG. 5 shows an example document listing the set of parameters in accordance with an example of the present subject matter.

FIG. 5 shows an example document listing the set of system parameters in accordance with an example of the present subject matter. The document 500 may, for example, be an XML document. In this example, the document 500 describe two LPARs of the computer system. Each LPAR comprises respective CPs. The document 500 provides for each central processor of each LPAR the values of the set of system parameters. In this example, the set of system parameters comprises: ambient temperature of the CP, chip temperature of a chip hosting the CP, chip NBTI of the chip, chip power of the chip, the chip identifier of the chip, and utilization level of the CP.

Figure 6:
FIG. 6 shows an example of scheduling rules in accordance with an example of the present subject matter.

FIG. 6 shows an example of scheduling rules in accordance with an example of the present subject matter. FIG. 6 shows three scheduling rule documents 601, 602 and 603. Each scheduling rule document comprises a respective scheduling rule. As shown in FIG. 6, each scheduling rule is defined by a name, a selection criterion and a search query. The selection criterion may be performed on a subset of system parameters. For example, the scheduling rule document 601 may have a selection criterion on a ranked list of utilization levels of the CPs. The scheduling rule document 602 may have a selection criterion on utilization levels, chip temperatures and chip powers of the CPs. The selection criterion is used by the scheduling engine to select the CP for scheduling.

In addition, each scheduling rule may indicate the optimization parameters which are also used by the scheduling engine. The optimization parameters may be one or more of the subset of system parameters used in the selection criterion as indicated by the scheduling rule documents 602 and 603 or may be all the system parameters as indicated by the scheduling rule document 601. For example, the scheduling rule document 603 has as optimization parameter the chip NBTI which is one of the subset of system parameters used by the selection criterion of the scheduling rule document 603.

Computing environment 800 contains an example of an environment for the execution of at least some of the computer code involved in performing the inventive methods, such as a workload scheduling code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 7:
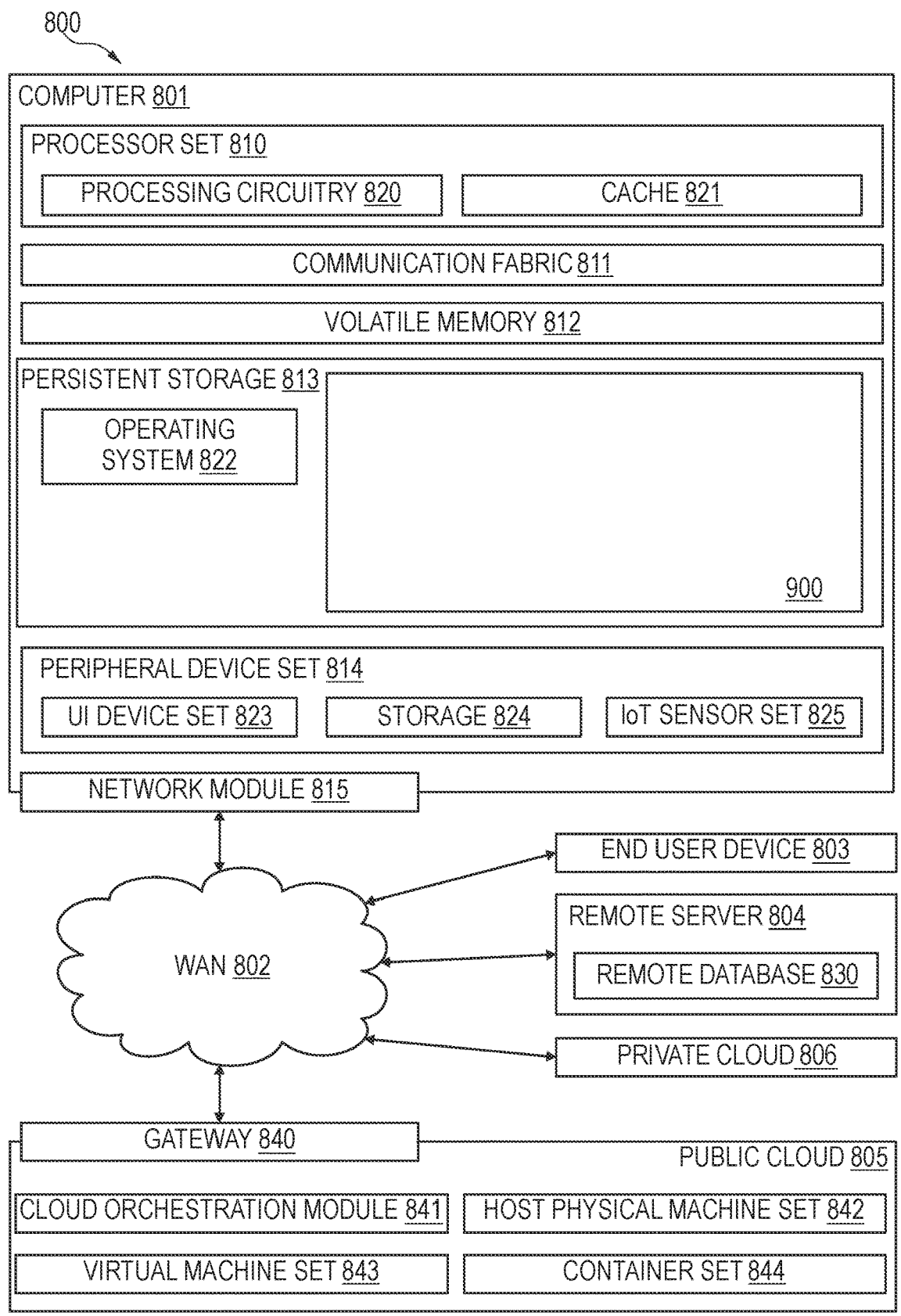
FIG. 7 is a computing environment in accordance with an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 7. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805.

The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
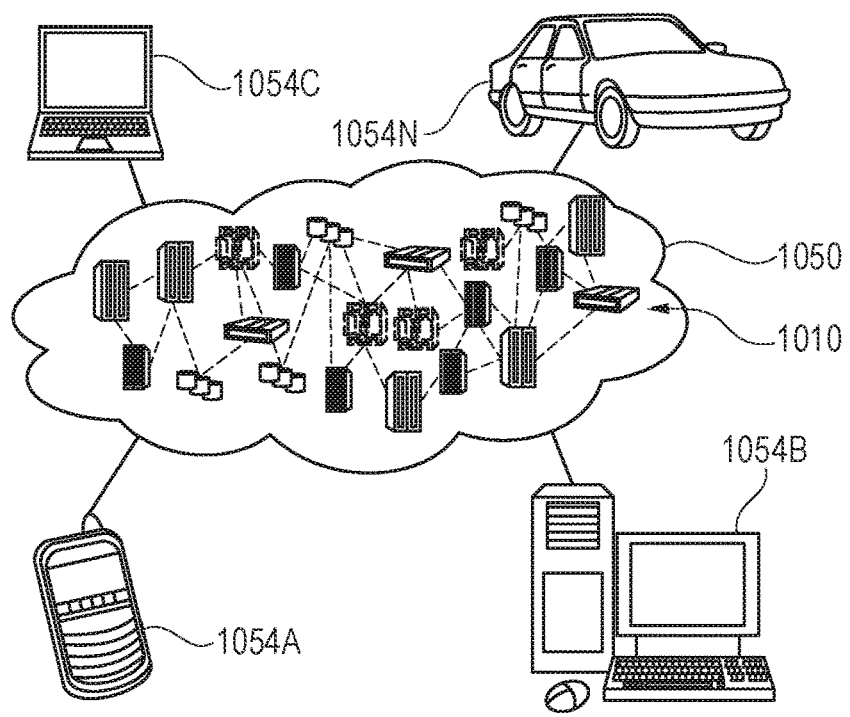
FIG. 8 depicts a cloud computing environment according to an embodiment of the present invention.

Referring now to FIG. 8, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 8 are intended to be illustrative only and that computing nodes 1010 and cloud computing environment 1050 can communicate with any type of computerized device over any type of network and/or network addressable connection (e.g., using a web browser).

Figure 9:
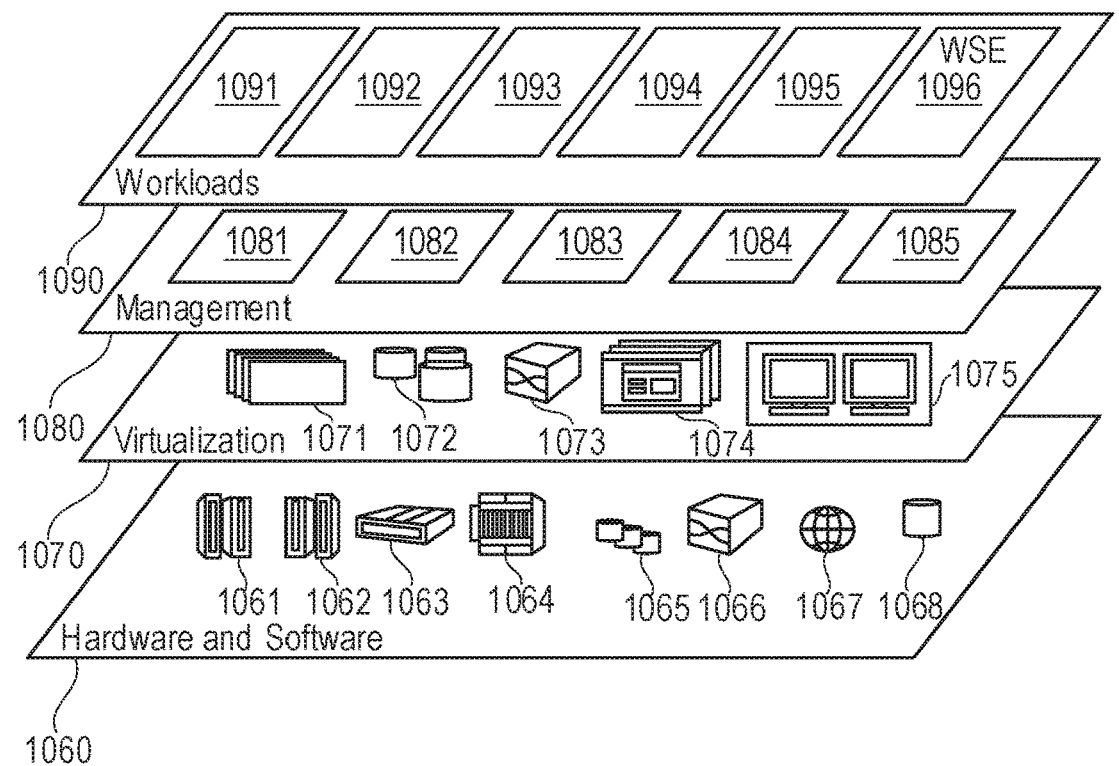
FIG. 9 depicts abstraction model layers according to an embodiment of the present invention.

Referring now to FIG. 9, a set of functional abstraction layers provided by cloud computing environment 1050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a workload scheduling engine (WSE) 1096 that performs the scheduling in accordance with the present subject matter e.g., as described with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A computer-implemented method comprising:
   indexing, by one or more processors, system documents of a computer system using a text search engine, resulting in a search index, wherein the system documents describe a set of system parameters, and associated numerical values, of the computer system;
   providing, by one or more processors, a set of scheduling rules for allocating computing resources of the computer system, each scheduling rule referencing one or more of the set of system parameters; and
   responsive to receiving a scheduling request that includes a search query:
      executing, by one or more processors, the search query by the text search engine against the search index, resulting in scored system documents and associated search queries;
      ranking, by one or more processors, the set of scheduling rules using numerical scores of the associated search queries;
      selecting, by one or more processors, scheduling rules in accordance with the ranking; and
      executing, by one or more processors, the selected scheduling rules for scheduling a workload on the computer system.

2. The computer-implemented method of claim 1, wherein executing the search query results in a set of scored system documents, further comprises:
   selecting, by one or more processors, a resource of the computer system;
   identifying, by one or more processors, one or more system documents of the system documents that describe the resource; and
   for each system document of the identified system documents, identifying, by one or more processors, the search queries that provide the respective system document, wherein the set of scheduling rules are the scheduling rules associated with the identified search query.

3. The computer-implemented method of claim 2, wherein the selected resource is a logical resource and the logical resource comprises a logical partition (LPAR).

4. The computer-implemented method of claim 1, further comprising:
   storing, by one or more processors, each scheduling rule in a respective scheduling rule document;
   indexing, by one or more processors, each scheduling rule document using the text search engine, resulting in a second search index; and
   searching, by one or more processors, by the text search engine, the second search index for identifying the search queries for performing the execution of the search queries.

5. The computer-implemented method of claim 1, wherein the selected scheduling rules are a first N ranked scheduling rules, wherein N is a predefined integer of at least one.

6. The computer-implemented method of claim 1, further comprising:
   responsive to detecting an update of the system documents, repeatedly performing, by one or more processors, the indexing, using the search index.

7. The computer-implemented method of claim 1, wherein:
   the computer system is partitioned into multiple logical partitions (LPARs); and
   the set of system parameters are descriptive of logical resources of the LPARs.

8. The computer-implemented method of claim 1, wherein the search is a user defined query.

9. The computer-implemented method of claim 1, wherein:
the numerical scores are relevance values obtained by a trained learning to rank (LTR) model; and
the search query is determined using the LTR model.

10. The computer-implemented method of claim 9, further comprising:
creating, by one or more processors, training data using feedback on results of previous search queries, the training data comprising queries and associated relevant documents; and
training, by one or more processors, the LTR model using the training data.

11. The computer-implemented method of claim 1, wherein:
each system parameter is descriptive of a resource of the computer system; and
the resource is a logical resource.

12. The computer-implemented method of claim 1, wherein each system parameter comprises a runtime parameter.

13. The computer-implemented method of claim 1, wherein each system parameter comprises a selection from the group consisting of: ambient temperature of a first processor of the computer system, chip temperature of a chip of the first processor, Negative Bias Temperature Instability (NBTI) of the chip, chip power of the chip, and chip identifier of the chip.

14. A computer program product comprising:
one or more computer readable storage media, and program instructions collectively stored on the one or more computer readable storage media, the program instructions comprising:
program instructions to index system documents of a computer system using a text search engine, resulting in a search index, wherein the system documents describe a set of system parameters, and associated numerical values, of the computer system;
program instructions to provide a set of scheduling rules for allocating computing resources of the computer system, each scheduling rule referencing one or more of the set of system parameters; and
program instructions, responsive to receiving a scheduling request that includes a search query, to:
program instructions to execute the search query by the text search engine against the search index, resulting in scored system documents and associated search queries;
program instructions to rank the set of scheduling rules using numerical scores of the associated search queries;
program instructions to select scheduling rules in accordance with the ranking; and
program instructions to execute the selected scheduling rules for scheduling a workload on the computer system.

15. The computer program product of claim 14, wherein program instructions to execute the search query results in a set of scored system documents, further comprise:
program instructions, collectively stored one or more computer readable storage media, to select a resource of the computer system;
program instructions, collectively stored one or more computer readable storage media, to identify one or more system documents of the system documents that describe the resource; and
program instructions, collectively stored one or more computer readable storage media, to, for each system document of the identified system documents, identify the search queries that provide the respective system document, wherein the set of scheduling rules are the scheduling rules associated with the identified search query.

16. The computer program product of claim 15, wherein the selected resource is a logical resource and the logical resource comprises a logical partition (LPAR).

17. The computer program product of claim 14, further comprising:
program instructions, collectively stored one or more computer readable storage media, to store each scheduling rule in a respective scheduling rule document;
program instructions, collectively stored one or more computer readable storage media, to index each scheduling rule document using the text search engine, resulting in a second search index; and
program instructions, collectively stored one or more computer readable storage media, to search, by the text search engine, the second search index for identifying the search queries for performing the execution of the search queries.

18. The computer program product of claim 14, wherein the selected scheduling rules are a first N ranked scheduling rules, wherein N is a predefined integer of at least one.

19. A computer system comprising:
one or more computer processors, one or more computer readable storage media, and program instructions collectively stored on the one or more computer readable storage media for execution by at least one of the one or more computer processors, the program instructions comprising:
program instructions to index system documents of a computer system using a text search engine, resulting in a search index, wherein the system documents describe a set of system parameters, and associated numerical values, of the computer system;
program instructions to provide a set of scheduling rules for allocating computing resources of the computer system, each scheduling rule referencing one or more of the set of system parameters; and
program instructions, responsive to receiving a scheduling request that includes a search query, to:
program instructions to execute the search query by the text search engine against the search index, resulting in scored system documents and associated search queries;
program instructions to rank the set of scheduling rules using numerical scores of the associated search queries;
program instructions to select scheduling rules in accordance with the ranking; and
program instructions to execute the selected scheduling rules for scheduling a workload on the computer system.

* * * * *